United States Patent [19]

Tanaka

[11] Patent Number: 4,521,148

[45] Date of Patent: Jun. 4, 1985

[54] HINGED MIRROR IMAGE PLASTIC FASTENER FOR QUICK ASSEMBLY TO THREADED MALE MEMBERS

[75] Inventor: Toshie Tanaka, Machida, Japan

[73] Assignee: Nifco Inc., Yokohama, Japan

[21] Appl. No.: 492,274

[22] Filed: May 6, 1983

[51] Int. Cl.$^3$ ............................................. F16B 13/06
[52] U.S. Cl. ..................................... 411/182; 411/15; 411/61; 411/908
[58] Field of Search .............................. 411/15, 21–23, 411/57, 60, 61, 70, 34–38, 173, 182, 908

[56] References Cited

U.S. PATENT DOCUMENTS

| | | | |
|---|---|---|---|
| 2,430,555 | 11/1947 | Burke | 411/173 |
| 3,756,116 | 9/1973 | Schuplin | 411/15 |
| 3,869,958 | 3/1975 | Murayama | 411/15 |
| 4,133,246 | 1/1979 | Small | 411/15 |
| 4,208,944 | 6/1980 | Moryl | 411/34 |
| 4,284,378 | 8/1981 | Mizusawa | 411/21 |

FOREIGN PATENT DOCUMENTS 948975  6/1974  Canada ................................. 411/61

*Primary Examiner*—Thomas J. Holko
*Assistant Examiner*—Neill Wilson

*Attorney, Agent, or Firm*—J. R. Halvorsen; T. W. Buckman

[57] ABSTRACT

A plastic fastener for panels comprises in combination a main body of the shape of an angular pillar provided at the upper end thereof with a flange, elastic tongues formed one each on one of the two pairs of opposed side walls of the main body and extended from the lower side of the flange and slanted downwardly toward the interior of the main body, and fitting means formed one each on the other pair of side walls as bulged outwardly, with the aforementioned elastic tongues provided at the lower ends thereof with grips having threads incised therein. With this plastic fastener, union of a supporting panel and a supported panel is accomplished by inserting the main body into a hole bored in advance in the supporting panel until the flange thereof comes into tight contact with the supported panel and depressing a screw past the supported panel into the main body thereby causing the threads on the grips to come into fast engagement with the threads on the screw. If the screw happens to be exposed to a force tending to expel the screw out of the panel, since the elastic tongues are inwardly slanted downwardly from the lower side of the flange, the resultant force has an effect of enhancing the squeeze of the grips on the screw.

1 Claim, 8 Drawing Figures

4,521,148

HINGED MIRROR IMAGE PLASTIC FASTENER FOR QUICK ASSEMBLY TO THREADED MALE MEMBERS

BACKGROUND OF THE INVENTION

This invention relates to a fastener for fastening two panels as opposed to each other across a fixed space by simple manipulation.

The fastener which is used for fastening an interior decorative board (trim board) to a body panel across a narrow intervening space in an automobile or the fastener which is used for fastening a printed circuit board or other similar board to a chassis across a space in an electric appliance comes in a variety of designs. As one typical version of the fastener of this principle, there may be cited what is generally known as a screw grommet. The screw grommet comprises a shank of a non-circular cross section adapted to expand radially by the insertion of a screw into a socket bored in the shank and a flange formed at the upper end of the shank. The use of this screw grommet is accomplished by forming in a supporting panel a through hole exactly conforming to the cross-sectional outline of the shank of the screw grommet, inserting the shank through this hole until the flange comes into intimate contact with the surface of the supporting panel, then applying fast to the upper surface of the flange a supported panel having bored in advance therein a hole for permitting insertion of the aforementioned screw, and helically driving the screw through the screw hole of the supported panel into the shank of the grommet. The helical insertion of the screw causes the shank to expand radially and secures the grommet in position so fast that it may not come off the supporting panel. Consequently, the supported panel in which the screw has been inserted is fastened to the supporting panel as separated by a distance equalling the thickness of the flange. The removal of the supported panel can be accomplished by rotating the screw in the opposite direction. (U.S. Pat. Nos. 3,869,958, 3,933,076 and 4,070,945).

The grommet of the construction described above inevitably necessitates a troublesome operation of helically driving the screw. With a view to enhancing the efficiency of work involved in actual use, there has been developed an improved grommet designed to obviate the necessity of helically driving a screw. Generally, the improved grommet has a plurality of protuberances formed in the shape of lines or dots on the inner surface of the screw socket bored into the shank. With this grommet, the fastening of two panels is effected by forcing the screw straight into the socket in the shank, so that the threads of the screw may ride over the protuberances and keep them elastically pushed backwardly to attach the supported panel fast to the supporting panel. Once the two panels are fastened as described above, the protuberances on the inner surface of the screw socket are engaged with the threads of the screw fast enough to prevent the screw from slipping off the screw socket. Thus, the two panels remain in fast union. For the separation of the panels, the removal of the screw from the screw socket is accomplished by reversely rotating the screw against the screw socket.

The fastener capable of providing fast union of two panels by simple depression of a screw makes the work of fastening the two panels easy. The known fastener of this type, however, is not free from disadvantages. When it is put to use, for example, a special tool is an absolute necessity. Moreover, since the screw during its depression into the socket causes no perceivable tactile sensation to the user, the extent to which the screw is depressed is variable from one user to another and, accordingly, the condition of the union consequently established between the two panels is open to personal error.

SUMMARY OF THE INVENTION

An object of this invention is to provide a plastic fastener for panels, which enables a supported panel and a supporting panel to be fastened as opposed to each other across a fixed space by having a headed screw rod depressed not helically but straightly into a matching socket and permits the fast union of the two panels thus established to be dissolved and consequently enables the supported panel to be separated from the supporting panel by rotating the headed screw rod in the direction of loosening the screw and which, when used particularly in the union of an interior decorative board (trim board) with a body panel in an automobile, enables the two panels to be united fast in a detachable manner quickly, uniformly, and safely by any person.

To accomplish the object described above according to the present invention, there is provided a plastic fastener for panels, which comprises in integral combination a main body of the shape of an angular pillar enclosed with four side walls and provided at the upper end thereof with a flange, fitting means formed one each on one of the two pairs of opposite side walls, and elastic tongues formed one each on the other pair of opposite side walls and provided each at the leading end thereof with a threaded grip.

The elastic tongues are formed as extended from the lower side of the flange and slanted downwardly toward the interior of the main body. The actual use of the fasetner is accomplished by inserting the main body into a matching rectangular hole bored in advance in a given supporting panel until the lower side of the flange comes into intimate contact with the upper surface of the supporting panel then applying a given supported panel to the upper surface of the flange, and depressing a screw from above the supported panel into the main body. Consequently, the thread on the screw comes into engagement with the threaded grips at the leading ends of the elastic tongues, with the result that the supported panel will be fastened to the supporting panel. If the supported panel already fastened to the supporting panel is subjected to any force tending to separate it from the supporting panel, since the elastic tongues are slanted downwardly toward tne interior of the main body, the resultant force tending to expel the screw out of the engagement has an effect of drawing the elastic tongues toward each other and causing them to tighten their squeeze on the screw. The screw is, consequently, nipped between the elastic tongues with force stronger than the force used for the depression of the screw.

The other objects and characteristic features of this invention will become apparent to those skilled in the art as the disclosure is made in the following description of a preferred embodiment of the invention, as illustrated in the accompanying drawings.

DESCRIPTION OF THE PREFERRED EMBODIMENT

Figure 1:
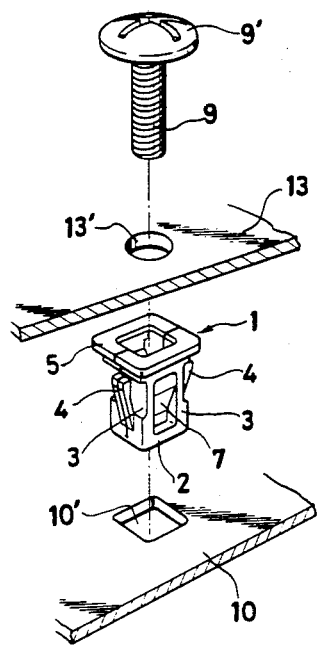
FIG. 1 is a perspective view of a typical fastener as one embodiment of this invention, illustrating the manner of use.
Figure 2:
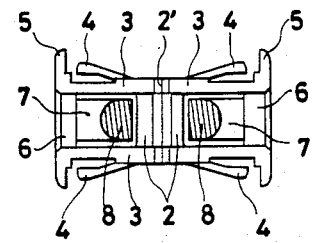
FIG. 2 is a plan view of the fastener in a completed state.
Figure 4:
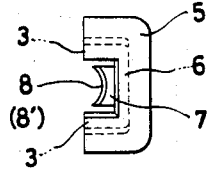
FIG. 4 is an end view of the fastener in the same state.
Figure 3:
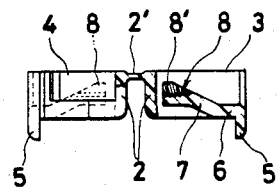
FIG. 3 is a partially sectioned side view of the fastener in the same state.
Figure 5:
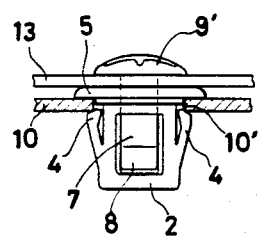
FIG. 5 is a front view of the fastener in a state keeping two panels in fast union.

This invention relates to a plastic fastener for fastening two panels as opposed to each other across a fixed intervening space. In the drawings, 1 denotes a plastic main body of the shape of an angular column (of a square cross section) provided with a bottom wall 2. This main body 1 is provided with a pair of opposed walls 3 and anchor pieces 4 formed one each on the outer surfaces of the side walls as outwardly slanted upwardly. The upper end of the main body is extended outwardly to form a flange 5. In the present embodiment, the side walls 3, the anchor pieces 4, the flange 5, and the bottom wall 2 are severally separated into two equal parts across a vertical plane. The two halves of the main body are connected into each other through a thin-wall hinge 2' formed between the halves of the bottom wall. The main body 1 of the construction described above is molded in a form having the two halves thereof developed in opposite directions from the hinge 2' as the center as illustrated in FIG. 2. The spread halves of the main body are bent at the hinge 2' and the corresponding halved side walls are abutted to complete the main body in its final shape of a rectangular pillar. The molding of the main body in its halved form as described above is solely for the convenience of the molding operation. If the main body can be molded wholly without requiring separation of the side walls 3, it may be molded in the shape of a rectangular pillar from the beginning.

In the other side walls of the main body adjoining the side walls 3 at right angles, short protruding pieces 6 are extended downwardly from the lower side of the flange. The upper ends of these protruding pieces join the inner sides of the upper ends of the side walls 3. From the lower ends of the protruding pieces 6, elastic tongues 7 having a width slightly smaller than the distance separating the opposed inner sides of the side walls 3 are extended aslant toward the interior of the rectangular pillar. The free ends of these elastic tongues each form a grip 8 having a plurality of female threads incised in an arcuately depressed surface.

The two grips 8 are opposed to each other inside the main body 1 so as to nip diametrically a male screw of a screw rod 9 which is depressed into the main body from above. The plurality of female threads 8' incised in the arcuately depressed surface of each of the grips 8 should be made to conform with the male threads formed on the screw rod 9. For actual use of the fastener, a rectangular hole 10' conforming with the cross-sectional outline of the main body is bored through a supporting panel 10 and the main body is depressed into this hole from above. Owing to this depression, the anchor pieces 4 are pressed by the edges of the hole toward the outer surfaces of the side walls 3 and, therefore, are allowed to move downwardly through the hole 10'. When they are about to complete their passage through the hole 10', they tend to spread out and resume their original state because of their elasticity. Thus, the anchor pieces 4 apply upward pressure to the edges of the hole 10'. At this time, the lower side of the flange 5 comes into tight contact with the upper surface of the supporting panel. As the result, the lower side of the flange 5 and the upper ends of the anchor pieces 4 nip the edges of the hole 10', causing the main body to be secured to the supporting panel. This fast attachment of the main body to the supporting panel effected jointly by the anchor pieces and the flange is similar to that obtainable with the known plastic anchor type fastener. Even when there is a slight dispersion in the thickness of the supporting panel, the dispersion can be absorbed enough to ensure the fast attachment.

Figure 7:
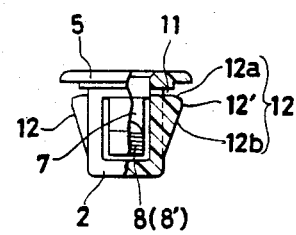
FIG. 7 is a partially sectioned front view of another typical fastener as another embodiment of the invention.
Figure 6:
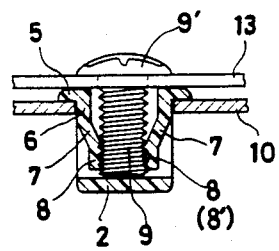
FIG. 6 is a side view of the fastener in the same state as above.
Figure 8:
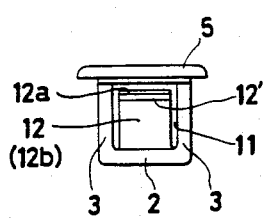
FIG. 8 is a side view of the same fastener.

The fast attachment of the main body to the supporting panel is not always required to rely upon the aforementioned function of the anchor pieces 4. It may be attained, instead, by utilizing the operating principle of some other well-known fastener. For example, as illustrated in FIG. 7 and FIG. 8, a slit in the shape of three sides of a square is cut in each of the side walls to form a tongue 12 having a free end falling on the upper side and the tongues 12 are bulged outwardly in the shape of a mountain. The upper portions of the tongues above the peaks 12' of the bulges are inwardly slanted upwardly and the lower portions thereof below the peaks inwardly slanted downwardly to form slanted surfaces 12a, 12b respectively. The main body is depressed into the hole 10' of the supporting panel until the peaks 12' slide past the edges of the hole and come to a rest below the panel, with the result that the upwardly converging slanted surface 12a and the lower side of the flange nip the panel fast in position.

After the main body has been secured to the supporting panel as described above, the screw rod 9 is passed through a hole 13' bored in advance in the supported panel 13 in a size enough to permit loose passage of the screw rod 9. The portion of the screw rod thrust out of the rear side of the panel 13 is depressed between the opposed grips 8. As a result, the grips 8 are pushed backwardly by the screw rod to allow passage of the threaded surface of the screw rod. When the rear side of the panel comes into tight contact with the upper surface of the flange 5 and the lower side of the head 9' of the screw rod collides against the surface of the panel and permits no further depression of the screw rod, the grips 8 cause the female threads on the arcuately depressed surfaces thereof to come into fast engagement with the male threads on the screw rod and thus nip the screw rod diametrically. Thus, the screw rod is not allowed to slip out of the main body and the supported panel and the supporting panel are fastened as opposed each other across an intervening space. The depression of the screw rod 9 can be made manually without use of any special tool.

In this embodiment, the screw rod advances while keeping the opposed grips 8 pushed backwardly with its threaded surface. Owing to the sharp tactile sensation caused to the user by the passage of the threaded surface of the screw rod through the opposed grips, the fact that the depression is completed to fasten the supporting panel and the supported panel tightly as described above and the male threads on the screw rod have come into engagement with the female threads on the grips can be clearly discerned by the tactile sensation. Thus, the fastener of this invention has the advantage that this sharp tactile sensation enables the panels to be fastened quickly, uniformly, and safely by any person.

The supported panel 13 is fastened to the supporting panel as described above. If the supported panel happens to be exposed to a force tending to separate it from the supporting panel (such as when a pull is given to the screw rod 9), since the elastic tongues 7 of the main body 1 are slanted toward the interior of the main body, the resultant force has an effect of causing the grips 8 to be drawn toward each other. As a result, the grips nip the screw rod with increased force and prevent it from accidental slippage.

When the screw rod is rotated in the direction opposite the leading direction of the male threads, it is released from the squeeze between the opposed grips. Consequently, the union of the two panels is dissolved and the supported panel can be separated from the supporting panel.

Although the male threads formed on the screw rod may be standard threads. To enhance the strength with which the screw rod is prevented from accidental slippage through the opposed grips, however, the grooves of these threads are desired to be given a particularly small radius. To permit quick dissolution of the unit of the two panels with a slight rotation of the screw rod, the male threads are desired to be in the form of multistart grooves such as double-start threads. The female threads on the grips are made to conform to these male threads. In the present embodiment, since the side walls 3 are equally halved and are molded in a state having the halves of the main body opened and extended in the opposite directions from the hinge 2' of the bottom wall 2, the bottom wall is an absolute necessity. This bottom wall may be omitted where the main body can be molded in its complete shape of a rectangular pillar from the beginning. In the case of the main body which is provided with the bottom wall, it is desirable to form at the center of this bottom wall a hole large enough to permit loose passage of the screw rod, so that the restriction otherwise imposed on the length of the screw rod allowed to thrust out of the rear side of the supporting panel 13 will be completely eliminated.

What is claimed is:

1. a plastic fastener for panels, comprising in integral combination of a main body of the shape of a pair of hinged angular U-shaped pillars each possessed of a pair of spaced opposed side walls interconnected by base means at the lower one end and provided with an interconnecting flange-like head extended outwardly from the opposite upper end boundaries, resilient fitting means provided one each on said side walls and adapted to grasp the edges of a hole bored in a supporting panel in cooperation with the lower side of said head, and mutually opposed elastic tongues forming intermediate side walls positioned between said spaced opposed side walls substantially at right angles and extended from the lower side of said head and slanted toward the interior of the angular pillar of the main body, and said base means, said tongues being provided adjacent the free ends thereof with a plurality of female threads incised in arcuately depressed surfaces, said main body base means forming an imperforate hinged wall, said pair of pillars being adapted to abut with each other along a vertical plane and the halves of the main body being connected to each other through a transverse thin-wall hinge formed in said bottom wall.

* * * * *